United States Patent [19]

Brown et al.

[11] 4,196,268

[45] Apr. 1, 1980

[54] HYDROLYSIS-RESISTANT FLEXIBLE POLYURETHANE FOAMS

[75] Inventors: Jasper H. Brown, East Alton, Ill.; Donald S. T. Wang, St. Louis, Mo.

[73] Assignee: Monsanto Company, St. Louis, Mo.

[21] Appl. No.: 3,189

[22] Filed: Jan. 15, 1979

[51] Int. Cl.$^2$ ...................... C08G 18/14; C08G 18/34; C08G 18/18

[52] U.S. Cl. ............................ 521/130; 260/45.85 T; 521/107; 521/128; 521/906

[58] Field of Search ............... 521/107, 128, 130, 906; 260/45.85 T

[56] References Cited

U.S. PATENT DOCUMENTS

| | | | |
|---|---|---|---|
| 3,143,517 | 8/1964 | Heiss | 521/130 |
| 3,157,613 | 11/1964 | Anderson et al. | 521/107 |
| 3,192,242 | 6/1965 | Birum | 521/107 |
| 3,416,601 | 12/1968 | Young et al. | 521/130 |
| 3,772,222 | 11/1973 | Steward et al. | 521/906 |
| 3,798,198 | 3/1974 | Hole | 521/130 |
| 3,847,843 | 11/1974 | Dany et al. | 521/107 |

*Primary Examiner*—H. S. Cockeram
*Attorney, Agent, or Firm*—George R. Beck

[57] ABSTRACT

Hydrolytic stability of flexible polyesterurethane foam containing haloalkyl phosphate fire retardant is substantially increased by including a small amount of alkyl benzyl phthalate in the reaction mixture used in preparation of the foam.

17 Claims, No Drawings

HYDROLYSIS-RESISTANT FLEXIBLE POLYURETHANE FOAMS

BACKGROUND OF THE INVENTION

Flexible foams made of polyesterurethane, i.e., polyurethane prepared by reaction of polyester-polyol and diisocyanate, have a variety of commercially important uses such as, for instance, insulation material, shock-resistant liners for packaging, and compressible closure gaskets, e.g. on doors of refrigerators, frozen food lockers and the like. It is known to include at least one haloalkyl phosphate in such foams to increase their fire resistance, but it has been found that in many cases, inclusion of such a phosphate tends to decrease hydrolytic stability of the foam. Particularly in settings involving public health, e.g. where food container closures must be subjected to steam-cleaning for sanitation purposes, inadequate hydrolytic stability of the foam can pose a major problem. Many of such foams lose much of their resilience or actually crumble after being steam-cleaned by procedures used conventionally on other flexible materials.

It is an object of this invention to provide flexible polyesterurethane foam containing haloalkyl phosphate fire retardant but having increased hydrolytic stability. Another object is to provide such foam having increased stability under conditions including exposure of the foam to steam. Another object is a method for increasing the hydrolytic stability of a flexible polyesterurethane foam containing haloalkyl phosphate. These and other objects will be apparent from the following disclosure in which all parts and percentages are by weight except where otherwise noted.

SUMMARY OF THE INVENTION

In accordance with this invention, it has been found that hydrolytic stability of flexible polyurethane foam prepared by subjecting to flexible polyurethane foam-forming conditions a mixture of haloalkyl phosphate and flexible polyurethane foam-forming reactants including polyester-polyol and diisocyanate can be substantially increased by including a relatively small amount of alkyl benzyl phthalate in said mixture. Accordingly, the invention provides (1) a method for increasing hydrolytic stability of such a foam by including in the mixture of reactants used in preparation of the foam an amount of alkyl benzyl phthalate sufficient to increase the hydrolytic stability of said foam and (2) the resulting flexible polyurethane foam composition prepared by subjecting to flexible polyurethane foam-forming conditions a mixture of foam-forming reactants including polyester-polyol and diisocyanate, haloalkyl phosphate and alkyl benzyl phthalate in such a hydrolytic stability-increasing amount.

DETAILED DESCRIPTION OF THE INVENTION

As used herein, polyurethane foam-forming reactants means polyurethane precursors capable of polymerizing by urethane linkage-forming reactions. In a preferred embodiment, the mixture of reactants used in preparation of the foam contains essentially no compounds which polymerize substantially, other than by urethane linkage-forming reactions, under conventional polyurethane foam-forming polymerization conditions. Also as used herein, the term "flexible" foam means a foam which can be compressed or elongated more than 10% without exceeding its elastic limit.

Typically, this invention is carried out using flexible polyurethane foam-forming reactants including polyester-polyol and organic diisocyanate. Preferred examples of the diisocyanate include arylene diisocyanates such as, e.g. toluene diisocyanate, and alkyl diisocyanates such as, e.g. hexamethylene diisocyanate. Optionally, e.g. for more foam resilience, the diisocyanate may contain a minor proportion of organic polyisocyanate. Normally, the polyester-polyol is an essentially linear polyester, for instance the reaction product of dicarboxylic acid such as alkylene (e.g. $\alpha,\omega$-alkylene) dicarboxylic acid, preferably containing from about 4 to about 8 carbon atoms per molecule, glycol such as alkylene (e.g. $\alpha,\omega$-alkylene) glycol, preferably containing from 2 to about 6 carbon atoms per molecule, and a small amount of alkylene triol, preferably containing from 2 to about 6 carbon atoms per molecule. Generally, the polyester-polyol contains an average of from about 2.1 to about 3 hydroxy radicals per molecule. Especially preferred is hydroxy-terminated polyester of adipic acid, ethylene glycol and a small amount of suitable triol such as, e.g. 1,2,3-propane triol. Average molecular weight of such a polyester-polyol is conventionally from about 500 to about 20,000 and even more typically from about 1,000 to about 6,000. Numerous examples of diisocyanates and polyester-polyols useful in preparation of flexible polyurethane foams are disclosed in published literature including, e.g. "Polyurethanes--Chemistry and Technology", J. H. Saunders and K. C. Frisch, Interscience Publishers, division of John Wiley & Sons, Parts I & II (1962 & 1964); "The Development and Use of Polyurethane Products", E. N. Doyle, McGraw-Hill Book Co. (1971); and "A Glossary of Urethane Industry Terms", S. Allen Stewart, The Martin Sweets Co., Inc., Louisville, Ky. (1971).

Usually such reactants are mixed in proportions such that the ratio of reaction NCO to OH groups in the mixture is at least about 100 (preferably from about 103 to about 105) and the mixture normally contains other constituents including, e.g. reaction catalyst such as an amine or tin salt, surfactant (generally of the silicone variety) and/or blowing agent (usually Freon) to lower density of the foam product. Most advantageously, but not necessarily, the foam is made in accordance with this invention using the "one-shot" procedure in which the polyurethan-forming reactants are combined without prior reaction of isocyanate and hydroxy radicals therein. Such procedure and other constituents are also described in the just-mentioned literature, the relevant portions of which are incorporated herein by reference.

The haloalkyl phosphates used in practice of this invention are phosphate esters containing at least one, typically at least two and preferably at least three haloalkyl groups. Normally the halogen in such groups is bromine, chlorine or a combination thereof, and chlorine is typically preferred. Each haloalkyl group has from about 2 to about 4 or more carbon atoms (most commonly from 2 to about 3 carbon atoms) and one or two halogen atoms. Although the alkyl groups can be branched or unbranched, better results are generally provided by this invention in embodiments using haloalkyl phosphates in which the alkyl is unbranched or otherwise insufficiently sterically hindered to prevent substantial hydrolysis of the haloalkyl group with accompanying generation of the corresponding hydrogen halide. Of particular value are those embodiments using haloalkyl phosphate in which the haloalkyl group is ω-haloalkyl, especially β-haloethyl. The phosphates useful in this invention can be monophosphates such as, e.g. tri-β-chloroethyl phosphate or tris(2,3-dibromopropyl)phosphate, or bis- or polyphosphates such as, e.g. bis-β-chloroethyl ethylene or diethylene glycol, 2,2-bis(chloromethyl)trimethylene bis[di(2-chloroethyl)phosphate] or similar diphosphates as described in U.S. Pat. No. 3,157,613 issued Nov. 17, 1964 to R. M. Anderson et al. and 3,192,242 issued June 29, 1965 to G. H. Birum, the disclosures of which are incorporated herein by reference. The tendency of such phosphates to interfere with hydrolytic stability of polyesterurethanes is known in the art, and much effort has been directed to identification of phosphates which would function satisfactorily as fire retardants for such polyurethanes without excessively diminishing their hydrolytic stability and/or presenting potential environmental problems.

The amount in which such a phosphate is used in the present invention can be any amount compatible with desired properties of the polyesterurethane, and particularly the desired fire resistance thereof. Usually such an amount is from about 5 to about 25 parts per hundred parts by weight of polyol used in production of the polyurethane (hereinafter "phr") and even more typically from about 10 to about 20 phr.

The alkyl benzyl phthalates employed herein are diesters of phthalic acid containing one benzyl radical and one alkyl radical per molecule. For best results that alkyl radical contains from about 2 to about 12 carbon atoms and preferably from about 4 to about 8 carbon atoms. Also desirably, but not necessarily, that alkyl is straight-chain, e.g. n-heptyl, n-octyl, n-hexyl or, usually most preferred, n-butyl. If desired, a mixture of such phthalates can be used. The amount of such phthalate used in this invention can be any amount sufficient to substantially increase the hydrolytic stability of a polyesterurethane as described herein. Typically such an amount is from about 2 to about 20 or more phr, preferably from about 3 to about 15 phr and, usually most desirably, from about 4 to about 12 phr. In some embodiments, especially good results are obtained using from about 4 to about 12 phr of alkyl benzyl phthalate in the presence of a tin salt such as, e.g. stannous octoate or oleate or dibutyltin diacetate or diethylhexoate, which may be present in various amounts but most typically from about 0.03% to about 0.4% based on the alkyl benzyl phthalate. Also for best results, the alkyl benzyl phthalate is advantageously included in the mixture of polyesterurethane foam-forming reactants in a weight ratio of said phthalate to the haloalkyl phosphate in that mixture from about 1:8 to about 2:1 and, usually even more desirably, from about 1:4 to about 1:1, although ratios outside the former of those ranges may be suitable in some instances.

In some embodiments of the invention, the alkyl benzyl phthalate can increase hydrolytic stability of the polyurethane independent of catalyst used in the diisocyanate-polyol reaction. In other embodiments, especially good results are obtained when the diisocyanate-polyol reaction mixture includes an amine catalyst, and particularly such a catalyst containing at least one >N-C-C-O- radical, e.g. N-ethyl or N-methyl morpholine, and especially those in which the nitrogen atom is less sterically hindered, e.g. bis 2-dimethylamino ethyl ether, dimethylamino-2 -propanol, etc. Although their effect on utility of alkyl benzyl phthalate in this invention is not fully clear and the scope of the invention should not be limited thereto it is believed that such amines form complexes with certain of the aforementioned haloalkyl phosphates under conditions normally employed in reaction of diisocyanate and polyesterpolyol to form a flexible polyurethane foam as described herein, and that such complexes may result in phospholipids which, on hydrolysis, liberate hydrogen halide which contributes to hydrolytic instability of the polyesterurethane. Thus it is believed that the invention is particularly attractive for use with a diisocyanate-polyol mixture containing a reaction catalyst composed predominantly, or at least substantially, by such an amine.

Hydrolytic instability of the polyurethanes described herein is important over a wide range of conditions encountered in storage and/or end use (including ambient conditions) as well as the relatively severe conditions commonly used in elevated-temperature cleaning (e.g. steam-cleaning) for sterilization, etc. However, it has become an industry standard to evaluate hydrolytic stability of such polyurethanes by procedure on the order of that set forth in ASTM Test Method D-1564-64T, and it is with reference to such a test that the term "hydrolytic stability" is used in this disclosure and the appended claims.

Following are specific examples (1–18) of flexible polyurethane foams produced in accordance with this invention. These examples are illustrative only and do not imply any limitations on the scope of the invention. Also provided are various comparative examples (A–E) showing the relative hydrolytic stability of otherwise-similar polyurethane foams prepared using diisocyanate-polyol reaction mixtures from which the alkyl benzyl phthalate was omitted.

EXAMPLES

Flexible polyurethane foams were prepared by reacting (initially at room temperature) an essentially uniform mixture of 100 parts of a branched, hydroxyl-terminated polyester having a hydroxyl number of 53, 3.6 parts distilled water, one part non-hydrolyzable surfactant for flame-retarded polyester foams, two parts of a 1:1 mixture of dimethylaminopropionitrile and bis 2-dimethyl amino ethyl ether, 0.2 parts tertiary amine catalyst and 46 parts toluene diisocyanate (NCO/OH index of 105). The polyester had been prepared by reaction of adipic acid with ethylene glycol containing a small amount of 1,2,3-propane triol. Essentially uniformly dispersed in separate equivalent portions of the reaction mixture were various proportions of the following haloalkyl phosphates and butyl benzyl phthalate (hereinafter BBP) as shown in Table I:

- 2,2-bis(chloromethyl)trimethylene bis[di(2-chloroethyl)phosphate] containing 0.075% stannous octoate and 0.15% phenathiazine (Monsanto Co. fire retardant product Phosgard® 2XC-20 organophosphorus compound; hereinafter 2XC-20)
- bis-β-chloroethyl diethylene glycol (hereinafter CDG)
- tri-β-chloroethyl phosphate (hereinafter CEF)
- (2,3-dibromopropyl)phosphate (hereinafter T23P)
- 2,2-bis(chloromethyl)trimethylene bis[di(2-chloroethyl)phosphate] (hereinafter CCP)
- 2,2-bis(chloromethyl)trimethylene bis[di(2-chloroethyl)phosphate] containing 0.2% phenathiazine and 0.2% 4,4′-thiobis(6-tert-butyl-m-cresol) (hereinafter CPT)

TABLE I

| Example | Phosphate | phr BBP |
|---|---|---|
| | (12 phr) | |
| A | 2XC-20 | none |
| 1 | " | 2 |
| 2 | " | 3 |
| 3 | " | 5 |
| 4 | " | 6 |
| 5 | " | 9 |
| 6 | " | 10 |
| B | CDG | none |
| 7 | " | 2 |
| C | CEF | none |
| 8 | " | 2 |
| D | T23P | none |
| 9 | " | 2 |
| 10 | CCP | 2 |
| 11 | " | 5 |
| 12 | " | 10 |
| 13 | CPT | 2 |
| 14 | " | 5 |
| 15 | " | 10 |
| | (18 phr) | |
| E | 2XC-20 | none |
| 16 | " | 2 |
| 17 | " | 5 |
| 18 | " | 10 |

Samples of the foams prepared from such mixtures were subjected to measurements of tensile strength at 100% elongation and at break, compression load deflection (hereinafter CLD) and % elongation at break in accordance with ASTM D-1564-64T. Equivalent samples of the foams were subjected to the same measurements after being maintained 5 hours in 121° C. steam in accordance with the autoclave test described in ASTM D-1564-64T, Sections 6-10. From the results (in Table II) it is apparent that in accordance with this invention, hydrolytic stability of flexible polyesterurethane foam containing a haloalkyl phosphate can be substantially increased by the inclusion of an alkyl benzyl phthalate.

TABLE II

| | Before Steam | | | | After Steam | | | |
|---|---|---|---|---|---|---|---|---|
| | | | Tensile Strength, kg/cm$^2$ | | | | Tensile Strength, kg/cm$^2$ | |
| Example | CLD, g/cm$^2$ | % Elong. at Break | At 100% Elong. | At Break | CLD, g/cm$^2$ | % Elong. at Break | At 100% Elong. | At Break |
| A | 57.0 | 206 | 0.99 | 1.63 | 15.5 | 19 | — | 0.21 |
| 1 | 56.9 | — | — | 1.33 | 24.6 | — | — | 0.61 |
| 2 | 51.3 | 178 | 0.89 | 1.29 | 8.4 | 29 | — | 0.13 |
| 3 | 54.1 | — | — | 1.56 | 21.1 | — | — | 1.12 |
| 4 | 50.0 | 206 | 0.97 | 1.56 | 17.6 | 40 | — | 0.31 |
| 5 | 57.0 | 184 | 0.91 | 1.56 | 16.9 | 52 | — | 0.36 |
| 6 | 56.2 | — | — | 1.62 | 35.2 | — | — | 1.26 |
| B | 43.6 | 173 | 0.80 | 1.17 | 3.5 | ( | crumbled | ) |
| 7 | 47.9 | 169 | 0.73 | 1.09 | 18.3 | 118 | 0.42 | 0.45 |
| C | 42.9 | 147 | 0.79 | 1.02 | 2.8 | ( | crumbled | ) |
| 8 | 44.3 | 185 | 0.81 | 1.25 | 19.0 | 198 | 0.50 | 0.75 |
| D | 42.9 | 194 | 0.73 | 1.10 | 5.6 | ( | crumbled | ) |
| 9 | 46.4 | 216 | 0.68 | 1.09 | 15.5 | 36 | — | 0.24 |
| 10 | 55.5 | — | — | 1.62 | 27.4 | — | — | 0.85 |
| 11 | 59.1 | — | — | 1.53 | 10.5 | — | — | 0.13 |
| 12 | 64.7 | — | — | 1.56 | 14.1 | — | — | 0.30 |
| 13 | 59.8 | — | — | 1.51 | 35.9 | — | — | 0.88 |
| 14 | 60.5 | — | — | 1.34 | 26.0 | — | — | 0.32 |
| 15 | 63.3 | — | — | 1.41 | 35.9 | — | — | 0.65 |
| E | 54.8 | 167 | 0.94 | 1.34 | ( | | crumbled | ) |
| 16 | 52.0 | 257 | 0.86 | 1.66 | ( | | crumbled | ) |
| 17 | 56.2 | 242 | 0.84 | 1.51 | 12.0 | 16 | — | 0.20 |
| 18 | 60.5 | 204 | 0.84 | 1.27 | 11.2 | 10 | — | 0.16 |

We claim:

1. Flexible polyurethane foam composition prepared by subjecting to flexible polyurethane foam-forming conditions a mixture of flexible polyurethane foam-forming reactants including polyester-polyol and diisocyanate, haloalkyl phosphate and alkyl benzyl phthalate in an amount sufficient to increase the hydrolytic stability of said foam.

2. Composition of claim 1 wherein the alkyl radical in said phthalate contains from about 4 to about 8 carbon atoms and said mixture contains from about 5 to about 25 phr chloroalkyl phosphate in which each chloroalkyl radical is unbranched and contains from about 2 to about 4 carbon atoms.

3. Composition of claim 2 wherein said mixture includes a catalyst for reaction of said reactants and said catalyst is substantially composed of amine containing at least one >N—C—C—O— radical per molecule.

4. Composition of claim 2, said mixture containing said phthalate and said phosphate in a weight ratio of phthalate to phosphate from about 1:8 to about 2:1.

5. Composition of claim 2, said phthalate being predominantly butyl benzyl phthalate.

6. Composition of claim 1, said phosphate containing at least two $\beta$-chloroethyl groups.

7. Composition of claim 6 wherein the alkyl radical in said phthalate is essentially straight-chain and contains from about 4 to about 8 carbon atoms.

8. Composition of claim 7 wherein said mixture includes a catalyst for reaction of said reactants and said catalyst is predominantly composed of amine containing at least one >N—C—C—O— radical per molecule.

9. Composition of claim 7, said mixture containing from about 10 to about 20 phr of said phosphate and said ratio being from about 1:4 to about 1:1.

10. Composition of claim 7, said mixture containing from about 4 to about 12 phr of said phthalate and, based on the weight of said phthalate, from about 0.03% to about 0.4% of a tin salt.

11. Composition of claim 7, said phthalate consisting essentially of butyl benzyl phthalate.

12. Method for increasing hydrolytic stability of flexible polyurethane foam prepared by subjecting to flexible polyurethane foam-forming conditions a mixture of haloalkyl phosphate and flexible polyurethane foam-forming reactants including polyester-polyol and polyisocyanate, which method comprises including alkyl benzyl phthalate in said mixture in an amount sufficient to increase the hydrolytic stability of said foam.

13. Method of claim 12 wherein the alkyl radical in said phthalate contains from about 4 to about 8 carbon atoms.

14. Method of claim 13 wherein said mixture includes a catalyst for reaction of said reactants and said catalyst is predominantly amine containing at least one >N—C—C—O— radical per molecule.

15. Method of claim 13 wherein said mixture contains from about 5 to about 25 phr chloroalkyl phosphate in which each chloroalkyl radical is unbranched and contains from 2 to about 3 carbon atoms.

16. Method of claim 15 wherein said phthalate and said phosphate are present in said mixture in a ratio of phthalate to phosphate from about 1:4 to about 1:1, said phosphate containing at least three $\beta$-chloroethyl groups.

17. Method of claim 16, said phthalate consisting essentially of butyl benzyl phthalate.

* * * * *

UNITED STATES PATENT AND TRADEMARK OFFICE
CERTIFICATE OF CORRECTION

PATENT NO. : 4,196,268
DATED : April 1, 1980
INVENTOR(S) : JASPER H. BROWN AND DONALD S. T. WANG It is certified that error appears in the above-identified patent and that said Letters Patent are hereby corrected as shown below:

Column 4, line 62, at the beginning of the line, before "(2,3-dibromopropyl)phosphate" insert -- tris --.

Signed and Sealed this

*Seventeenth* Day of *June 1980*

[SEAL]

*Attest:*

SIDNEY A. DIAMOND

*Attesting Officer* *Commissioner of Patents and Trademarks*